(12) United States Patent
Huschenhoefer et al.

(10) Patent No.: US 10,837,507 B2
(45) Date of Patent: Nov. 17, 2020

(54) BRAKE DISC FOR A MOTOR VEHICLE, BRAKE SYSTEM

(71) Applicant: Robert Bosch GmbH, Stuttgart (DE)

(72) Inventors: Wolfgang Huschenhoefer, Asslar (DE); Hans-Walter Mueller, Munich (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/320,689

(22) PCT Filed: May 11, 2015

(86) PCT No.: PCT/EP2015/060296
§ 371 (c)(1),
(2) Date: Dec. 20, 2016

(87) PCT Pub. No.: WO2016/005080
PCT Pub. Date: Jan. 14, 2016

(65) Prior Publication Data
US 2017/0152903 A1 Jun. 1, 2017

(30) Foreign Application Priority Data
Jul. 10, 2014 (DE) .................. 10 2014 213 402

(51) Int. Cl.
*F16D 65/12* (2006.01)
*F16D 65/00* (2006.01)
*F16D 65/02* (2006.01)

(52) U.S. Cl.
CPC ..... *F16D 65/0006* (2013.01); *F16D 65/0012* (2013.01); *F16D 65/12* (2013.01);
(Continued)

(58) Field of Classification Search
CPC ........... F16D 65/0006; F16D 2065/132; F16D 2065/1328; F16D 2065/1344;
(Continued)

(56) References Cited

U.S. PATENT DOCUMENTS 2,025,873 A * 12/1935 Lane ................. F16D 65/10
188/218 R
3,655,425 A * 4/1972 Longo ................. C23C 4/06
75/230
(Continued)

FOREIGN PATENT DOCUMENTS

CN 101282795 A 10/2008
DE 23 58 140 A1 6/1975
(Continued)

OTHER PUBLICATIONS

International Search Report corresponding to PCT Application No. PCT/EP2015/060296, dated Sep. 16, 2015 (German and English language document) (6 pages).

*Primary Examiner* — Bradley T King
*Assistant Examiner* — Stephen M Bowes
(74) *Attorney, Agent, or Firm* — Maginot, Moore & Beck LLP

(57) ABSTRACT

A brake disk for a motor vehicle includes a friction ring and at least one insert portion. The insert portion is located within and arranged coaxially with the friction ring, and is configured so as to possess an annular disk shape and define a plurality of openings. The friction ring is configured such that material of the friction ring fills the plurality of openings.

9 Claims, 1 Drawing Sheet

(52) U.S. Cl.
CPC ............... *F16D 2065/1316* (2013.01); *F16D 2065/1324* (2013.01); *F16D 2065/1328* (2013.01); *F16D 2200/0004* (2013.01); *F16D 2200/0039* (2013.01); *F16D 2250/0015* (2013.01)

(58) Field of Classification Search
CPC ..... F16D 2200/0039; F16D 2250/0015; F16D 65/125
See application file for complete search history.

(56) References Cited

U.S. PATENT DOCUMENTS

| | | | |
|---|---|---|---|
| 5,143,184 A * | 9/1992 | Snyder | F16D 13/64 188/218 A |
| 5,613,578 A | 3/1997 | Moseley et al. | |
| 7,163,653 B2 * | 1/2007 | Ehnert | F16D 69/02 264/259 |
| 7,937,819 B2 * | 5/2011 | Hanna | B22D 19/00 164/98 |
| 2004/0035658 A1 | 2/2004 | Ehnert | |
| 2007/0235270 A1 | 10/2007 | Miskinis et al. | |
| 2008/0099289 A1 * | 5/2008 | Hanna | F16D 65/0006 188/218 XL |
| 2009/0020379 A1 | 1/2009 | Hanna et al. | |
| 2012/0186919 A1 | 7/2012 | Hanna et al. | |
| 2013/0048447 A1 * | 2/2013 | Hanna | F16D 65/12 188/218 XL |

FOREIGN PATENT DOCUMENTS

| | | | |
|---|---|---|---|
| DE | 24 58 335 A1 | 6/1976 | |
| DE | 692 00 762 T2 | 5/1995 | |
| DE | 101 42 768 A1 | 5/2002 | |
| DE | 102005033352 A1 * | 1/2007 | ............. F16D 65/12 |
| DE | 10 2006 033 772 A1 | 1/2008 | |
| DE | 11 2006 002 490 T5 | 7/2008 | |
| DE | 10 2014 200 705 A1 | 7/2014 | |
| EP | 525439 A1 * | 2/1993 | ........... F16D 65/125 |
| EP | 1091136 A2 * | 4/2001 | ............. F16D 55/08 |
| JP | 54-29283 U | 2/1979 | |
| JP | 7-83254 A | 3/1995 | |
| JP | 7-217681 A | 8/1995 | |
| JP | 2002-126865 A | 5/2002 | |
| JP | 2017-519955 A | 7/2017 | |
| WO | 2013/127896 A1 | 9/2013 | |

* cited by examiner

BRAKE DISC FOR A MOTOR VEHICLE, BRAKE SYSTEM

This application is a 35 U.S.C. § 371 National Stage Application of PCT/EP2015/060296, filed on May 11, 2015, which claims the benefit of priority to Serial No. DE 10 2014 213 402.1, filed on Jul. 10, 2014 in Germany, the disclosures of which are incorporated herein by reference in their entirety.

The disclosure relates to a brake disk for a motor vehicle having a friction ring and at least one insert portion which is located in the friction ring.

The disclosure further relates to a brake system for a motor vehicle having a corresponding brake disk.

Background

Brake disks and brake systems of the type mentioned in the introduction are known from the prior art. Thus, for example, the laid-open specification WO2013/127896 A1 discloses a brake disk for a motor vehicle having a friction ring, in which an insert portion is cast, wherein the insert portion is intended to have a foam-like, porous structure. The insert portion may in this instance be cast in the form of braids, pins or needles.

Summary

A brake disk according to the disclosure has the advantage that it is configured so as to be optimized in terms of vibrations so that vibrations are damped in the friction ring by a specific configuration of the insert portion. There is provision according to the disclosure for the insert portion to be constructed in the form of an annular disk and to be arranged coaxially with respect to the friction ring, wherein the insert portion has a plurality of openings which are filled by material of the friction ring. The insert portion is therefore constructed in the form of an annular disk and is arranged in the friction ring so as to be coaxial with respect to the friction ring so that the insert portion is surrounded by the material of the friction ring over the entire periphery, in particular by cast material of the friction ring. In this case, the insert portion has a plurality of openings, wherein the openings are filled with material of the friction ring. The term "opening" is intended to be understood in this context to be an opening which extends completely through the insert portion. As a result, the friction ring partially extends through the openings of the insert portion. To put it another way, the friction ring has a plurality of connection portions which extend through the friction ring or the openings of the friction ring. An advantageous vibration damping of the brake disk can thereby be readily achieved. In particular, the vibration damping can readily be adapted to an application by the number and formation of the openings.

According to an advantageous development of the disclosure, there is provision for the openings to be arranged so as to be distributed uniformly over the periphery of the insert portion. On the one hand, there is thereby produced an advantageous vibration damping for the brake disks and, on the other hand, it is ensured that no imbalances can occur in the brake disk as a result of irregular openings and therefore as a result of irregular material distribution.

According to a preferred development of the disclosure, there is further provision for the insert portion to be produced from a ceramic material. The construction of the insert portion as a ceramic insert portion results in the advantage that the total weight of the brake disk is kept small and, at the same time, the optimum vibration damping can be achieved. As a result of the porosity which is generally produced in the case of a ceramic component, it is further possible for an advantageous connection of the friction ring and the insert portion to be ensured over the entire periphery of the insert portion. In addition to the openings, through which the material of the friction ring extends completely, the porous surface of the ceramic insert portion allows material of the friction ring to be able to be partially introduced at the edge of the insert portion, whereby a particularly compact and reliable connection between the friction ring and the insert portion is ensured.

There is further preferably provision for the openings to have at least two different sizes. Whereas in principle the openings may all be constructed to be the same, therefore, there is provision in this case for there to be provided two different types of openings which particularly differ from each other in terms of the cross-sectional surface area thereof. There are thereby produced introduction portions of the friction ring through the insert portion, which introduction portions have different widths. Depending on the selection of the sizes, consequently, the vibration behavior of the brake disk can further be influenced.

There is further preferably provision for the openings to have at least two different contours. As a result of the contour selected, the vibration behavior of the brake disk can be influenced. As a result of the provision of at least two different contours, the vibration behavior is further optimized. Alternatively, all the openings may have the same contour.

According to an advantageous development of the disclosure, there is provision for the insert portion to be provided with a plurality of projecting ribs. As a result of the insert portion being cast in with the material of the friction ring, there is thereby produced an additional positive-locking connection which contributes to the vibration behavior of the brake disk.

A further brake system according to the disclosure has at least one brake disk which can be associated with a wheel of the motor vehicle and a brake shoe device which is associated with the brake disk and which can be actuated. The brake system is distinguished by the construction of the brake disk according to the disclosure. There are thereby produced the mentioned advantages with respect to the advantageous vibration damping behavior of the brake disk which acts in an advantageous manner on the operation of the brake device. Additional features and advantages will be appreciated from what has already been described above and by additional features of the descriptions, drawings, and claims.

Brief Description of the Drawings

The disclosure is intended to be explained in greater detail below with reference to an embodiment. In the drawings.

Detailed Description

Figure 1:
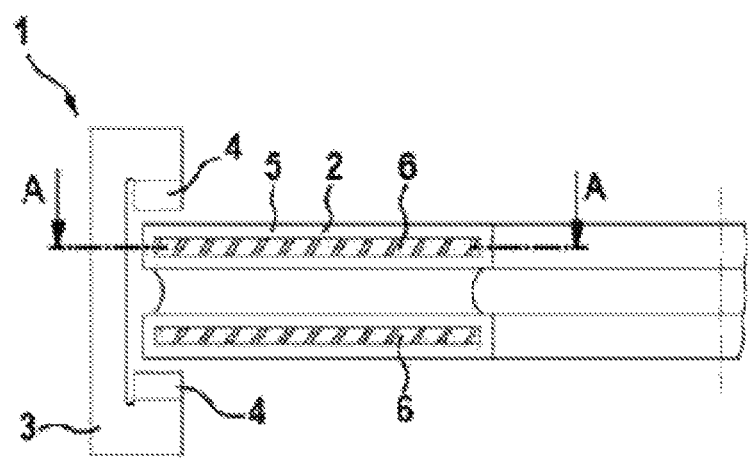
FIG. 1 is a simplified top view of a brake system for a motor vehicle.

FIG. 1 is a simplified cross section of a brake system 1 for a motor vehicle which is not shown here in greater detail. The brake system 1 has a brake disk 2 which can be associated with a wheel of the motor vehicle and a brake device 3 which is associated with the brake disk 2. The brake device 3 has two displaceable brake shoes 4 which can be pressed against the end faces of the brake disk 2 in order to carry out the braking operation. Such brake systems 1 are known in principle so that they are not intended to be discussed in greater detail at this point. In this instance, it should be noted that the brake disk 2 has a friction ring 5 in which two insert portions 6 are located. The friction ring 5 is constructed in an annular manner and is produced from a cast material. The insertion portions 6 are also constructed in an annular manner and are located at the inner side of the friction ring 5. The insert portions 6 are produced from a ceramic material in this instance.

Figure 2:
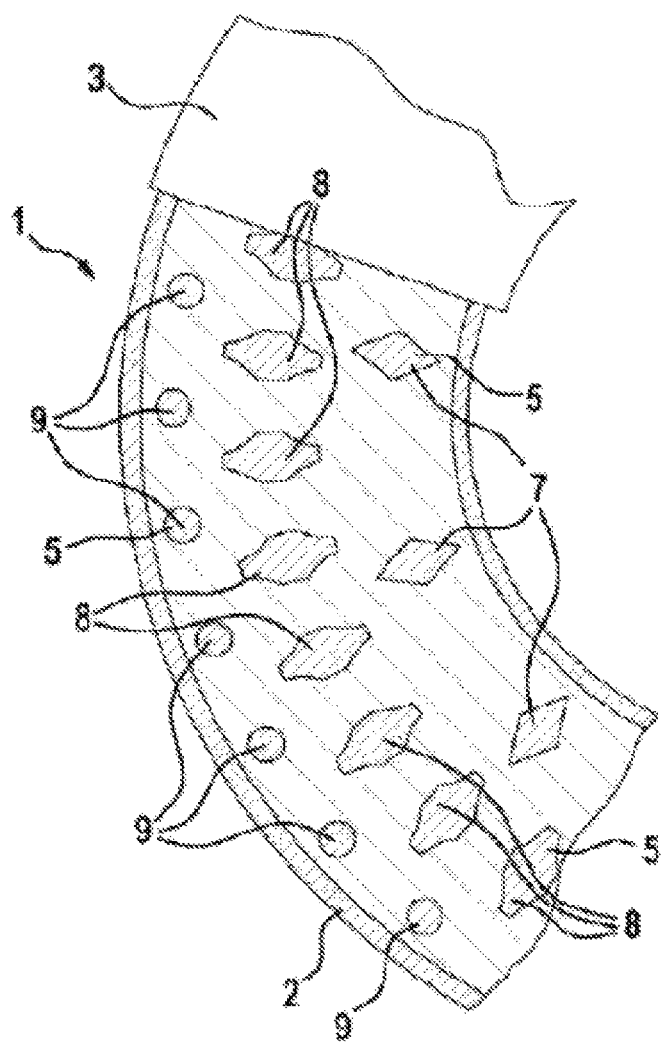
FIG. 2 is a simplified side view of the brake system.

FIG. 2 is a cross section of the brake disk 2 along the line A-A from FIG. 1, which is located in the plane of one of the insert portions 6. The insert portion 6 has in a state distributed over the periphery thereof openings 7, 8 and 9. The openings 7, 8 and 9 each have different contours and are arranged so as to be uniformly distributed over the periphery of the insert portion 6. The openings 7 have a lozenge-like contour, the openings 9 have a circular contour and the openings 8 have a star-like contour. Since the openings 7, 8, 9 extend completely through the material of the insert portion 6, the material of the friction ring 5 extends through the openings during the production of the brake disk 2. There are thereby produced advantageous vibration properties for the brake disk 7. As a result of the construction of the insert portion 6 or the insert portions 6 from ceramic material, the weight of the brake disk 2 is generally further reduced in this case. The vibration behavior of the brake disk can be adapted to the respective application as a result of the number and construction of the openings 7, 8 and 9. There may particularly be provision for only the openings 7 or only the openings 8 or only the openings 9 to be provided. There may also be provision for the openings 7, 8 and/or 9 to be located on the same radius of the insert portion and not, as in the present embodiment, on different radii.

The invention claimed is:

1. A brake system for a motor vehicle comprising:
at least one brake disk for a wheel of the motor vehicle that includes:
a friction ring;
at least one insert portion having an annular disk shape, and located within and arranged coaxially with the friction ring, the at least one insert portion defining a plurality of openings,
wherein the friction ring is configured such that material of the friction ring fills the plurality of openings, and
wherein the at least one insert portion is surrounded by the material of the friction ring over the entire periphery of the at least one insert portion; and
at least one actuatable brake device assigned to the brake disk,
wherein the at least one insert portion is a ceramic material,
wherein the plurality of openings includes a plurality of lozenge-like openings, a plurality of circular openings, and a plurality of additional openings shaped uniformly and shaped differently from the plurality of lozenge-like openings and the plurality of circular openings,
wherein the lozenge-like openings of the plurality of lozenge-like openings are located a first distance from a rotational axis of the at least one insert portion,
wherein the circular openings of the plurality of circular openings are located a second distance from the rotational axis of the at least one insert portion,
wherein the additional openings of the plurality of additional openings are located a third distance from the rotational axis of the at least one insert portion,
wherein the third distance is greater than the first distance and the second distance, and
wherein the first distance is less than the second distance and the third distance.

2. The brake system according to claim 1, wherein the at least one insert portion is a first insert portion and the brake disk further comprises:
a second insert portion having an annular disk shape and located within and arranged coaxially with the friction ring and the first insert portion, the second insert portion spaced apart from the first insert portion and defining a further plurality of openings.

3. The brake system according to claim 2, wherein each opening of the plurality of openings includes a periphery defined completely by the at least one insert portion.

4. A brake disk for a motor vehicle comprising:
a friction ring;
a first insert portion having an annular disk shape and located within and arranged coaxially with the friction ring, the first insert portion defining a first plurality of openings; and
a second insert portion having an annular disk shape and located within and arranged coaxially with the friction ring and the first insert portion, the second insert portion spaced apart from the first insert portion and defining a second plurality of openings,
wherein the friction ring is configured such that the material of the friction ring fills the first plurality of openings and the second plurality of openings,
wherein the first insert portion is surrounded by the material of the friction ring over the entire periphery of the first insert portion,
wherein the second insert portion is surrounded by the material of the friction ring over the entire periphery of the second insert portion,
wherein the first insert portion is a ceramic material,
wherein the second insert portion is a ceramic material,
wherein the first plurality of openings includes a plurality of lozenge-like openings, a plurality of circular openings, and a plurality of additional openings shaped uniformly and shaped differently from the plurality of lozenge-like openings and the plurality of circular openings,
wherein the lozenge-like openings of the plurality of lozenge-like openings are located a first distance from a rotational axis of the first insert portion,
wherein the circular openings of the plurality of circular openings are located a second distance from the rotational axis of the first insert portion,
wherein the additional openings of the plurality of additional openings are located a third distance from the rotational axis of the first insert portion,
wherein the third distance is greater than the first distance and the second distance, and
wherein the first distance is less than the second distance and the third distance.

5. The brake disk according to claim 4, wherein:
each opening of the first plurality of openings includes a periphery defined completely by the first insert portion; and
each opening of the second plurality of openings includes a periphery defined completely by the second insert portion.

6. A brake disk for a motor vehicle, comprising:
a friction ring; and at least one insert portion having an annular disk shape, and located within and arranged coaxially with the friction ring, the at least one insert portion defining a plurality of openings, wherein the friction ring is configured such that material of the friction ring fills the plurality of openings, wherein the at least one insert portion is surrounded by the material of the friction ring over the entire periphery of the at least one insert portion, wherein the friction ring defines a first end face and a second end face against which displaceable brake shoes are configured to be pressed, wherein the material of the friction ring defines completely the first end face and the second end face, wherein the at least one insert portion is a ceramic material, wherein the plurality of openings includes a plurality of lozenge-like openings, a plurality of circular openings, and a plurality of additional openings shaped uniformly and shaped differently from the plurality of lozenge-like openings and the plurality of circular openings, wherein the lozenge-like openings of the plurality of lozenge-like openings are located a first distance from a rotational axis of the at least one insert portion, wherein the circular openings of the plurality of circular openings are located a second distance from the rotational axis of the at least one insert portion, wherein the additional openings of the plurality of additional openings are located a third distance from the rotational axis of the at least one insert portion, wherein the third distance is greater than the first distance and the second distance, and wherein the first distance is less than the second distance and the third distance.

7. The brake disk according to claim 6, wherein each opening of the plurality of openings is distributed uniformly around the at least one insert portion.

8. The brake disk according to claim 6, wherein the at least one insert portion is a first insert portion and the brake disk further comprises:

a second insert portion having an annular disk shape and located within and arranged coaxially with the friction ring and the first insert portion, the second insert portion spaced apart from the first insert portion and defining another plurality of openings.

9. The brake disk according to claim 6, wherein each opening of the plurality of openings includes a periphery defined completely by the at least one insert portion.

* * * * *

UNITED STATES PATENT AND TRADEMARK OFFICE
CERTIFICATE OF CORRECTION

PATENT NO. : 10,837,507 B2  
APPLICATION NO. : 15/320689  
DATED : November 17, 2020  
INVENTOR(S) : Huschenhoefer et al.

Page 1 of 1

It is certified that error appears in the above-identified patent and that said Letters Patent is hereby corrected as shown below:

In the Claims

In Claim 3, at Column 4, Line 14: "The brake system according to claim 2" should read --The brake system according to claim 1--.

Signed and Sealed this
Twenty-sixth Day of January, 2021

Drew Hirshfeld
*Performing the Functions and Duties of the
Under Secretary of Commerce for Intellectual Property and
Director of the United States Patent and Trademark Office*